(12) United States Patent
Lorhpipat

(10) Patent No.: US 8,800,157 B2
(45) Date of Patent: Aug. 12, 2014

(54) SPORTS NETTING

(75) Inventor: Sarun Lorhpipat, Bangkok (TH)

(73) Assignee: Satian Industries Co. Ltd., Sampran Nakhonpathom (TH)

( * ) Notice: Subject to any disclaimer, the term of this patent is extended or adjusted under 35 U.S.C. 154(b) by 730 days.

(21) Appl. No.: 13/123,285

(22) PCT Filed: Oct. 6, 2009

(86) PCT No.: PCT/EP2009/062990
§ 371 (c)(1),
(2), (4) Date: May 5, 2011

(87) PCT Pub. No.: WO2010/040759
PCT Pub. Date: Apr. 15, 2010

(65) Prior Publication Data
US 2011/0205555 A1    Aug. 25, 2011

(30) Foreign Application Priority Data
Oct. 9, 2008    (GB) .................................. 0818536.5

(51) Int. Cl.
*G01B 5/14*    (2006.01)
*G01B 5/24*    (2006.01)
*G01B 5/06*    (2006.01)

(52) U.S. Cl.
CPC    *G01B 5/061* (2013.01); *G01B 5/14* (2013.01); *G01B 5/24* (2013.01)
USPC .................. 33/613; 33/701; 33/832; 473/197; 473/483

(58) Field of Classification Search
CPC ............ G01B 5/02; G01B 5/061; G01B 5/14; G01B 5/23; G01B 5/24
USPC ......... 33/1 LE, 263, 613, 645, 700, 701, 832, 33/833; 273/407, 410; 473/197, 473, 474, 473/479, 483, 490, 492–495
See application file for complete search history.

(56) References Cited

U.S. PATENT DOCUMENTS

| | | | |
|---|---|---|---|
| 1,351,066 A * | 8/1920 | Robinson | 473/495 |
| 1,534,447 A * | 4/1925 | Hardy | 473/495 |
| 3,549,146 A * | 12/1970 | Davis | 473/474 |
| 4,247,099 A * | 1/1981 | Pandak | 473/474 |

(Continued)

OTHER PUBLICATIONS

"Sports Imports Product Catalogue," copyright date 2006 <http://www.sportsimports.com/pdf/catalog2006.pdf>.

(Continued)

*Primary Examiner* — G. Bradley Bennett
(74) *Attorney, Agent, or Firm* — Sutherland Asbill & Brennan LLP

(57) ABSTRACT

Disclosed is a method and apparatus for measuring the drop Y of sports netting (10) strung between opposed posts (14, 16), wherein a datum point (28) is provided on each post, a datum line (42) is provided between the datum points and the distance Y between the datum line and a specified part (38) of the net measured; the height X above ground (40) of the net is extrapolated by providing the datum points (28) at a known height Z above ground (40) and subtracting the measured drop Y from the datum point height Z: the datum line (42) may be a light-weight cord strung between the datum points or a beam of visible or invisible light.

14 Claims, 2 Drawing Sheets

(56) References Cited

U.S. PATENT DOCUMENTS

| | | | |
|---|---|---|---|
| 4,973,055 A * | 11/1990 | Muir | 473/495 |
| 4,976,432 A * | 12/1990 | Cheney | 473/492 |
| 5,215,310 A | 6/1993 | Allbright | |
| 5,411,254 A * | 5/1995 | Dressler et al. | 473/549 |
| 6,868,619 B1 * | 3/2005 | Boren et al. | 33/760 |
| 6,955,617 B1 * | 10/2005 | Boren et al. | 473/495 |
| 8,460,133 B2 * | 6/2013 | Williams | 473/495 |
| 2007/0099732 A1 * | 5/2007 | Scarpa et al. | 473/490 |
| 2012/0295743 A1 * | 11/2012 | Williams | 473/495 |
| 2013/0165277 A1 * | 6/2013 | Wang | 473/496 |

OTHER PUBLICATIONS

Combined Search and Examination Report for Application No. GB0818536.5 dated Jan. 13, 2009.

Search Report for International Application No. PCT/EP2009/062990 dated Sep. 10, 2008.

* cited by examiner

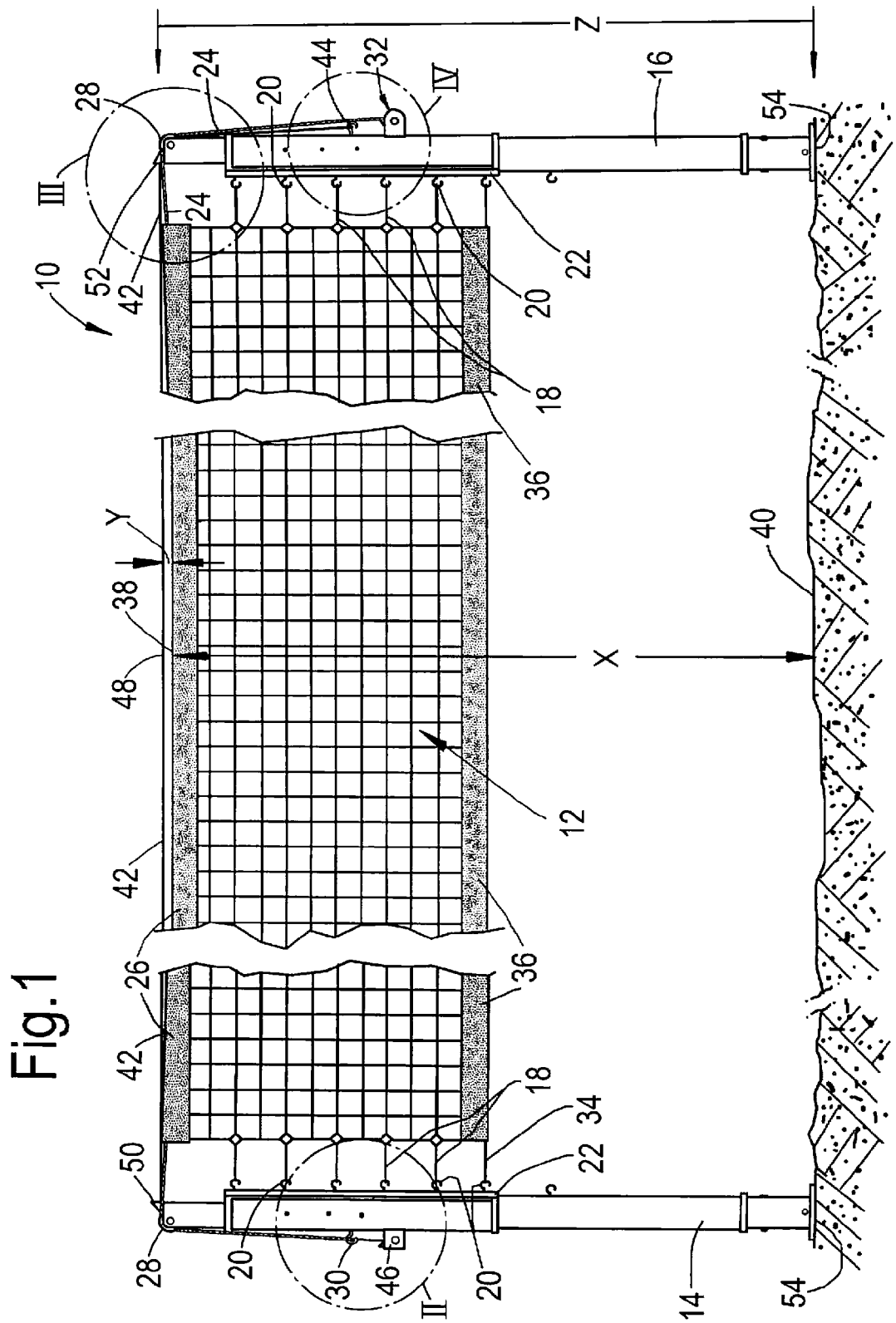

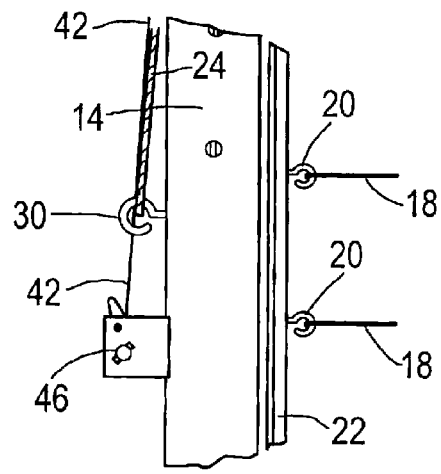
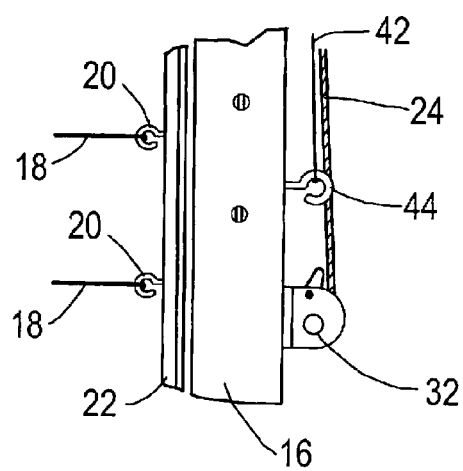
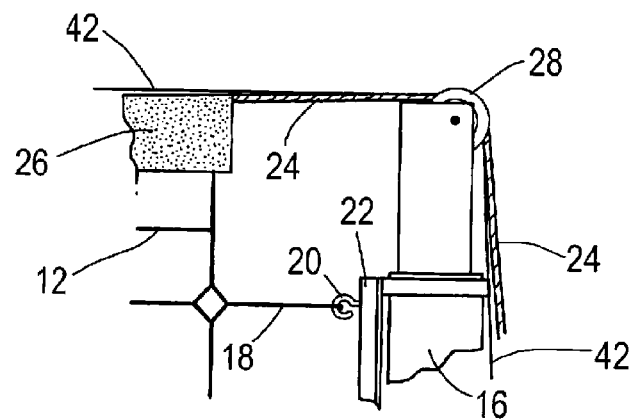

SPORTS NETTING

CROSS-REFERENCE TO RELATED APPLICATION

This is a submission pursuant to 35 U.S.C. §154(d)(4) to enter the national stage under 35 U.S.C. §371 for PCT/EP2009/062990 filed Oct. 6, 2009. Priority is claimed under 35 U.S.C. §119(a) and 35 U.S.C. §365(b) to Patent Application Number GB 0818536.5 filed Oct. 9, 2008. The subject matter of PCT International Application Number PCT/EP2009/062990 and Patent Application Number GB 0818536.5 are hereby expressly incorporated herein by reference in their entirety.

This invention relates to sports netting and it particularly relates to a method of and apparatus for measuring the drop of and for setting the height of sports netting, such as for volleyball, badminton, Sepaktakraw, and tennis.

BACKGROUND

The tension and height of a sports net can affect players to a great degree. This is because the net's height and tension determines the strategy of the players. Having a very taut net can decrease the probability of the ball going over the net when it is spiked. A taut net is not so crucial because it has equal effects on both sides, while a slack net line can cause great disadvantages to the defending side and tremendous advantage to the attacking side. Therefore the net height and hence net tension must be maintained constant and to an official specification.

Keeping the net height constant is vital both in practice and competition because athletes will adapt their technique and playing style according to the conditions of the training and competition grounds. Therefore all measurements especially for the net must be kept constant. This will ensure maximum potential for athletes because the net's tension and height in competition will be substantially identical to practice conditions.

However, it is impossible for the net to be perfectly parallel with the court floor due to the weight of the net and the net suspension cable pulling down towards the floor. This will cause a minute downward curve, a catenary, in the net suspension cable, generally having its lowest point in the centre of the net line. Because of this curved effect, official regulation allows only certain degrees of difference between the bottom of the curve to an imaginary horizontal of the net line (an acceptable range is between 0.03-0.05 m for Sepaktakraw).

This is usually achieved by monitoring and adjusting net height repeatedly throughout a game. The process can take quite a long time as it requires the judge or referee to measure the height of the top edge of the net from the ground with a tape measure or ruler. Despite the time taken, the process is still accurate and is officially accepted. However, the measuring process is only accurate with a flat, leveled court or playing ground; therefore with sports such as beach volleyball or any other net sport played outdoors on uneven ground the degree of accuracy achieved by the current procedure and equipment decreases significantly.

Sports netting may be defined as an elongated net strung under tension between opposed uprights or posts; the netting being usually deployed to separate a court into two parts. The height and structure of the net and the supports are closely defined for many sports. For example, the Regulation of the International Sepak Takraw Federation (ISTAF) specifies:
"Net The net shall be made of fine ordinary cord or nylon with 6 mm to 8 mm mesh. The net shall be 0.7 m in width and not shorter than 6.10 m in length and taped at 0.05 m from tape double at the top and sideline, called boundary tape.

The net shall be edged with 0.05 m tape double at the top and the bottom of the net supported by a fine ordinary cord or nylon cord that runs through the tape and strain over and flush with the top of the posts. The top of the net shall be 1.52 m (1.42 m for women) in height from the centre and 1.55 m (1.45 m for women's) at the posts."

PRIOR ART

Document U.S. Pat. No. 5,215,310 (ALLBRIGHT) relates to a tensioning and support system for a sports net (volleyball) assembly that uses a compound pulley arrangement attached to one of the vertical supports to simultaneously adjust the tension placed on both the upper and lower net cables. In one embodiment, each support has a standard extending upward from the ground, an upper elongated member, and a clamp for adjustably securing the upper elongated member to the upper portion of the standard to allow height adjustment of the net. A scale mounted between the upper end of the standard and the elongated member at approximately eye-height permits accurate measurement of the height of the net. The disclosed net height measuring system makes no allowance for net drop.

OBJECT

It is an object of the present invention to provide a method and apparatus for measuring the drop of a sports net, from which the height can be extrapolated, that is both quicker than the above-described methods and which is independent of playing surface topography or contour.

STATEMENT OF INVENTION

According to the present invention, a method of measuring the drop of a sports net strung between opposed posts comprises the steps of providing a datum point on each post, providing a datum line between the datum point on each post and measuring the distance between the datum line and a specified part of the net.

According to the present invention, a net drop measuring apparatus for a sports net strung between opposed posts comprises a datum point on each post and a datum line extending between the datum point on each post, whereby the net drop between the datum line and a specified part of the net can be measured.

Also according to the present invention, a method of measuring the height above ground of a sports net strung between opposed posts comprises the steps of providing a datum point of known height above ground on each post, measuring the drop of the net by the method of the present invention and extrapolating the net height above ground from the known height above ground of the datum point and the measured drop of the net.

Also according to the present invention, a height measuring apparatus for a sports net strung between opposed posts comprises a datum point of known height above ground on each post and a net drop measuring apparatus according to the present invention.

According to an embodiment of the present invention, wherein the net is strung under tension between upper and lower attachment points on each post and wherein the upper attachment points, each being at a set height above ground, constitute the datum points.

According to another embodiment of the present invention, the datum line is a cord strung under tension between the opposed posts, the datum-cord having a weight less than the weight of the net, such that the drop of the datum-cord is negligible in comparison with the drop of the net.

According to a further embodiment of the present invention, the datum line is provided by a beam of light emitted by a light source located at the datum point on one post and directed at a target located at the datum point on the other post.

INTRODUCTION TO THE DRAWINGS

The above and further features of the present invention are illustrated by way of example in the drawings, wherein:

FIG. 1 is an elevational view of a Sepaktakraw net with a net drop height measuring apparatus in accordance with embodiments of the present invention;

FIG. 2 is a detail of that part of FIG. 1 identified by circle II;

FIG. 3 is a detail of that part of FIG. 1 identified by circle IV; and,

FIG. 4 is a detail of that part of FIG. 1 identified by circle III.

DETAILED DESCRIPTION

A shown by the figures, sports netting 10 comprises a meshed net 12 strung tightly between a pair of upright posts 14, 16. Each side of the net 12 is anchored to a respective post 14, 16 by a series of cords 18 each extending laterally from the net mesh and respectively linked to hooks 20 carried by a vertical anchor bar 22 mounted to the inner topside of each post 14, 16.

The net 12 is tensioned by a suspension cord or cable 24 passing through the upper tape 26 of the net, over pulleys 28 journalled in the tops of posts 14, 16, to extend from a hook anchor 30 on post 14 to a ratchet, net-cord 24 tensioning, reel 32 on post 16.

The bottom of the net 12 is tensioned by a cord 34 passing through the lower tape 36 of the net 12 and extending between respective hooks 20 on anchor bars 22.

As will be seen, the top edge 38 of the net curves downwardly due to the weight of the net, the suspension cord 24 and the net tension produced by cords 18. As previously described, the regulation height of the net is set by the height X of the centre 38 of the net above the playing surface 40.

A net drop measuring apparatus in accordance with the present invention comprises a datum-cord 42 extending from a datum-cord hook anchor 44 on post 16 to a ratcheted, datum-cord tensioning reel 46 on post 14, the cord passing over the pulley 28 at the top of each post 14, 16. The datum-cord 42 is tensioned by rotation of the datum-cord tensioning reel 46 until the datum-cord extends in a straight line, i.e., without an appreciable curve or drop, between the post pulleys; the datum-cord is aligned with and above the top edge 38 of net 12. The weight of the datum-cord 42 is light in comparison to the weight of the net-cord 24, such that any drop or curve in datum-cord 42 will be negligible in comparison to that of the suspension net-cord 24.

The pulley 28 at the top of each post 14, 16 sets a datum point. The datum-cord 42 will extend from these datum points above the top edge 38 of net 12 so that the net drop, the vertical height Y between the centre 48 of the datum-cord and the centre 38 of the net-cord, can be measured, using a rule or any other linear measuring device.

For beach games such as Sepaktakraw or volleyball, each post has a foot plate 54 which limits the depth to which a post can be inserted into the sand and will thus set the datum points (pulleys 28) at a known height Z above ground level, irrespective of the topography or contour of the playing surface 40 between the posts. The actual height X of the centre 38 of the net above a nominal ground level, drawn between the two foot plates 54, can be extrapolated from the datum pulley height Z and the net drop height Y using the simple formula:

$$X=Z-Y$$

The net height can then readily be set by adjusting the suspension net-cord 24 tensioning reel 32 until the requisite net drop height X is obtained, with allowance for the regulation difference specified between post height and net centre height; 0.03 m in the above-given ISTAF regulation. This extrapolated net height measurement is obtained irrespective of the topography or contours of the playing surface 40 beneath the centre of the net. With a beach game, the sand playing surface will inevitably be disturbed during a game. In use, when the net height requires checking, the datum-cord 42 is extended from the datum-cord tensioning reel 46 over the two pulleys 28 down to the datum-cord hook anchor 44, the datum-cord 42 is then tensioned, the net drop height Y measured and the tension of the net-cord 24 adjusted accordingly. The datum-cord 42 can then be unhooked and wound back onto the datum-cord tensioning reel 46, which may be spring loaded.

Clearly, this method of net measurement is quicker and more accurate than the convention ground-to-net measurement, especially with a rough playing surface.

In an another embodiment, also shown in FIG. 1, the datum-cord 42 is replaced by an infra-red emitter 50 positioned on the top of post 14 and an infra-red target receiver or panel 52, such as a receiver or plain panel on the top of post 16. Observation of the infra-red target receiver or panel 52 can show when the infra-red emitter 50, e.g., a photo-diode, is aligned; the target receiver panel may be of a material that fluoresces when illuminated. Other forms of light beam responsive devices could be used as a target receiver panel to detect the light beam from the emitter for light beam.net alignment. The infra-red emitter 50 and the infra-red target receiver or panel 52 are respectively located right above the points where the net-cord 24 enters/exits the pulleys 28.

The net drop, centre-to-centre distance Y, can be measured using a known type of rule that emits visible light when illuminated, alternatively infra-red light visualising glasses or goggles could be used. The advantage of using an invisible infra-red beam is that it can be left on for the whole of a game without distracting the players. Alternatively a switched beam of visible light could be used. Both beam systems are clearly quicker to use than having to unreel, tension and then rewind a datum-cord. The whole beam system, emitter and target may be demountable.

While the present invention has been described in the context of beach games, it is clearly applicable to any sport requiring a net of specified height.

The invention claimed is:

1. A method of measuring the drop of a sports net strung (10) between opposed posts (14, 16), comprising the steps of—i) providing a datum point (28) on each post; ii) providing a datum line (42) between the datum point on each post;

and, iii) measuring the distance Y between the datum line and a specified part (38) of the net.

2. A method as claimed in claim 1, wherein the datum line (42) is removable.

3. A method as claimed in claim 1, wherein the specified part is the centre (38) of the top of the net (10).

4. A method of measuring the height above ground of a sports net (10) strung between opposed posts (14, 16), comprising the steps of: i) providing a datum point (28) of known height Z above ground (40) on each post; ii) measuring the drop Y of the net; and, iii) extrapolating the net height X above ground from the known height Z above ground of a datum point and the measured drop of the net.

5. A net drop measuring apparatus for a sports net (10) strung between opposed posts (14, 16) comprising:—i) a datum point (28) on each post; and ii) a datum line (42) extending between the datum points, whereby the net drop between the datum line and a specified part of the net can be measured.

6. Apparatus as claimed in claim 5, wherein the net (10) is strung under tension between upper (28) and lower (22) attachment points on each post (14, 16) and wherein the upper attachment points (28), each being at a set height Z above ground (40), constitute the datum points (28).

7. Apparatus as claimed in claim 5, wherein the datum line is a cord (42) strung under tension between the datum points (28) on the opposed posts (14, 16), the datum-cord having a weight less than the weight of the net (10); such that the drop of the cord is negligible in comparison with the drop Y of the net.

8. Apparatus as claimed in claim 7, wherein the datum-cord (42) is removeably deployable between a reel (46) attached to one post (14) and an anchorage (32) on the other post (16).

9. Apparatus as claimed in claim 8, wherein the upper attachment points comprise a pulley (28) at the top of each post (14, 16) and the datum cord (42) is removably deployable from the reel (46) on one post (14), over the two pulleys (28) to the anchorage (32) on the other post (16).

10. Apparatus as claimed in claim 5, wherein the datum line is provided by a beam of light emitted by a light source (50) located at the datum point (28) on one post (14) and directed at a target (52) located at the datum point (28) on the other post (16).

11. Apparatus as claimed in claim 5, comprising a reel (46) of light-weight cord (42) adapted to be attached to a sports netting post (14) and a cord anchor (44) adapted to be fitted to an opposed sports netting post (16) and means to tension the cord in use when strung between the reel and the anchor and over the posts.

12. Apparatus as claimed in claim 10, comprising a light beam source (50) adapted to be attached to the top (28) of a sports netting post (14) and target (52) adapted to be attached to the top (28) of an opposed sports netting post (16).

13. Sports netting posts provided with height measuring apparatus as claimed in claim 5.

14. Posts as claimed in claim 13 and provided with foot plates (54) which limit the depth to which a post (14, 16) can be inserted into the ground (40) and thereby set a height Z above ground (40) of the datum points (28).

\* \* \* \* \*